United States Patent
Wang et al.

(10) Patent No.: US 12,003,633 B2
(45) Date of Patent: Jun. 4, 2024

(54) TECHNIQUES, DEVICES, AND INSTRUCTION SET ARCHITECTURE FOR BALANCED AND SECURE LADDER COMPUTATIONS

(71) Applicant: NVIDIA Corporation, Santa Clara, CA (US)

(72) Inventors: Shuai Wang, Shanghai (CN); Chen Yao, Shanghai (CN); Xiao Wu, Shanghai (CN); Rongzhe Zhu, Shanghai (CN); Yuji Qian, Shanghai (CN); Kun Yang, San Jose, CA (US); Weiping Pan, Shanghai (CN); Xixi Xie, Jiangsu (CN)

(73) Assignee: Nvidia Corporation, Santa Clara, CA (US)

( * ) Notice: Subject to any disclaimer, the term of this patent is extended or adjusted under 35 U.S.C. 154(b) by 147 days.

(21) Appl. No.: 17/707,605

(22) Filed: Mar. 29, 2022

(65) Prior Publication Data
US 2023/0283462 A1    Sep. 7, 2023

Related U.S. Application Data

(63) Continuation of application No. PCT/CN2022/074569, filed on Jan. 28, 2022.

(51) Int. Cl.
*H04L 9/08*    (2006.01)
*G06F 21/55*    (2013.01)

(52) U.S. Cl.
CPC ............ *H04L 9/088* (2013.01); *G06F 21/554* (2013.01); *G06F 2221/034* (2013.01)

(58) Field of Classification Search
CPC ... H04L 9/088; G06F 21/554; G06F 2221/034
USPC ........................................................ 713/171
See application file for complete search history.

(56) References Cited

U.S. PATENT DOCUMENTS

| 5,751,620 | A | 5/1998 | Monier |
| 5,982,900 | A | 11/1999 | Ebihara et al. |
| 6,008,703 | A | 12/1999 | Perrott et al. |
| 6,085,210 | A | 7/2000 | Buer |
| 6,088,453 | A | 7/2000 | Shimbo |
| 6,298,442 | B1 | 10/2001 | Kocher et al. |

(Continued)

FOREIGN PATENT DOCUMENTS

| CN | 1691580 A | 11/2005 |
| CN | 1985458 A | 6/2007 |

(Continued)

OTHER PUBLICATIONS

Joye et al., "The Montgomery Power Ladder", LCIS, Dept. of Computer Science and Information Engineering, 2003, pp. 291-302.

(Continued)

*Primary Examiner* — Dereena T Cattungal
(74) *Attorney, Agent, or Firm* — Lowenstein Sandler LLP

(57) ABSTRACT

Disclosed are apparatuses, systems, and techniques to perform and facilitate secure ladder computational operations whose iterative execution depends on secret values associated with input data. Disclosed embodiments balance execution of various iterations in a way that is balanced for different secret values, significantly reducing vulnerability of ladder computations to adversarial side-channel attacks.

22 Claims, 7 Drawing Sheets

(56) References Cited

U.S. PATENT DOCUMENTS

| | | | |
|---|---|---|---|
| 6,748,410 B1 | 6/2004 | Gressel et al. | |
| 7,027,597 B1 | 4/2006 | Stojancic et al. | |
| 7,966,361 B1 | 6/2011 | Moni et al. | |
| 9,851,905 B1 | 12/2017 | Ramalingam et al. | |
| 2002/0039418 A1 | 4/2002 | Dror et al. | |
| 2006/0140399 A1 | 6/2006 | Young | |
| 2006/0285682 A1 | 12/2006 | Sarangarajan et al. | |
| 2008/0049931 A1* | 2/2008 | Vasyltsov | H04L 9/3066 380/28 |
| 2009/0113252 A1* | 4/2009 | Lambert | G06F 7/725 714/48 |
| 2010/0177887 A1 | 7/2010 | Ciet et al. | |
| 2013/0114806 A1 | 5/2013 | Bertoni et al. | |
| 2013/0311532 A1 | 11/2013 | Olsen | |
| 2014/0281573 A1* | 9/2014 | Jaffe | H04L 9/003 713/189 |
| 2017/0060535 A1 | 3/2017 | Teglia | |
| 2017/0061119 A1 | 3/2017 | Teglia | |
| 2017/0257211 A1* | 9/2017 | Vigilant | H04L 9/302 |
| 2018/0211065 A1* | 7/2018 | Jaffe | H04L 9/003 |
| 2019/0036678 A1 | 1/2019 | Ahmed | |
| 2019/0089523 A1 | 3/2019 | Adjedj | |
| 2019/0227736 A1 | 7/2019 | Hong et al. | |
| 2019/0354498 A1 | 11/2019 | Ebsen et al. | |
| 2020/0344056 A1 | 10/2020 | Guilley et al. | |
| 2021/0083840 A1* | 3/2021 | Tunstall | H04L 9/3249 |
| 2021/0243006 A1 | 8/2021 | Meyer | |
| 2022/0075879 A1* | 3/2022 | Hamburg | G06F 21/602 |
| 2022/0085998 A1 | 3/2022 | Xiao et al. | |
| 2022/0085999 A1 | 3/2022 | Hamburg et al. | |
| 2023/0195418 A1 | 6/2023 | Kondru | |

FOREIGN PATENT DOCUMENTS

| | | |
|---|---|---|
| CN | 102207847 A | 10/2011 |
| CN | 108111309 A | 6/2018 |
| CN | 108228137 A | 6/2018 |
| CN | 108833120 A | 11/2018 |
| CN | 111712816 A | 9/2020 |
| TW | 201437910 A | 10/2014 |
| WO | 2005048008 A2 | 5/2005 |
| WO | 2021211678 A1 | 10/2021 |

OTHER PUBLICATIONS

International Search Report and Written Opinion, PCT/CN2022/074569, dated May 30, 2022, (9 pages).

International Search Report and Written Opinion for International Application No. PCT/CN2022/074567, mailed Sep. 28, 2022, 6 Pages.

International Search Report and Written Opinion for International Application No. PCT/CN2022/074568, mailed Oct. 26, 2022, 8 Pages.

International Search Report and Written Opinion for International Application No. PCT/CN2022/074570, mailed Oct. 26, 2022, 7 Pages.

* cited by examiner ns of a Montgomery ladder exponentiation with balanced
TECHNIQUES, DEVICES, AND INSTRUCTION SET ARCHITECTURE FOR BALANCED AND SECURE LADDER COMPUTATIONS

RELATED APPLICATIONS

The application claims the benefit of priority under 35 U.S.C. 365 to the international application PCT/CN2022/074569, filed Jan. 28, 2022 with the China National Intellectual Property Administration, which is hereby incorporated in its entirety.

TECHNICAL FIELD

At least one embodiment pertains to technologies used to perform and facilitate modular computational operations. For example, at least one embodiment pertains to the protection of cryptographic computations from unauthorized attacks that attempt to gain access to secret keys and other protected information. Disclosed are computational techniques, hardware accelerator devices, and an instruction set architecture that protects against leakage of sensitive data during execution of conditional instructions during ladder-type computations, including exponentiation and multiplication.

BACKGROUND

The strength of cryptographic applications depends on how well secret keys used by these applications are protected from unauthorized access and malicious attacks. Even keys that are resistant to brute-force attacks (e.g., attacks that check various possible key values) may be vulnerable to side-channel attacks. In a side-channel attack, an attacker performs monitoring of various signals (e.g., electric signals produced by electronic circuits of the target computer. Based on the recorded signals, a hardware trojan or a malicious software can correlate processor and/or memory activity with operations carried out by the target computer. A simple power analysis (SPA) side-channel attack can determine electric power consumed by the device as a function of time, since different operations, such as storing, erasing, flipping, etc., bits of data can require slightly different amounts of energy for their performance. As noise can mask the signals emitted by the processor/memory, even more sophisticated differential power analysis (DPA) attacks can be carried out, which include examination of statistical correlations of the power measurements performed over multiple cryptographic operations (or multiple iterations of a single cryptographic operation). A DPA attacker can filter out the noise component of the power signal and extract the component of the signal that is representative of the processing operations. This can reveal secret information (e.g., private key values) that is otherwise well-protected against brute-force attacks. Various methods of obfuscations aimed to reduce correlations ("leakage") between signals emitted by a computing device and operations performed thereon are often used to reduce the likelihood of success of side-channel attacks.

DETAILED DESCRIPTION

Figure 1:
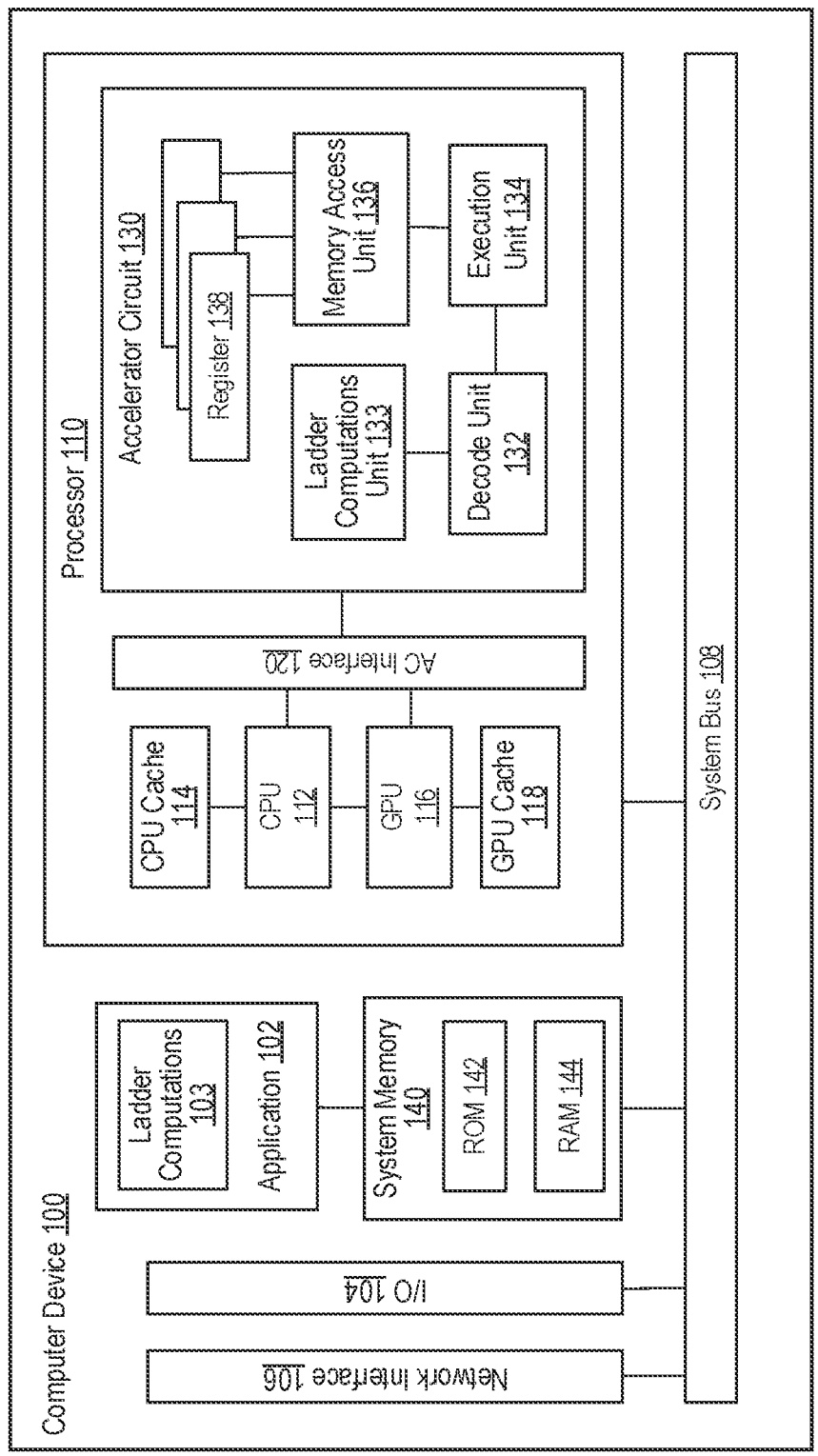
FIG. 1 is a block diagram of an example computer device that performs balanced ladder computations for enhanced protection against side-channel attacks, in accordance with at least some embodiments.

Public/private key cryptography is a staple component of modern computer software and hardware systems, used in a multitude of applications, including confidential communications, time-stamping, non-repudiation protocols, cryptocurrency, and so on. In some systems, a cryptographic application may be instantiated during system boot and used for all secure data communications (e.g., between a processor and a system memory). In public-key cryptography systems, a computing device may perform operations on large binary numbers as part of various algorithms, such as Rivest-Shamir-Adelman (RSA), Diffie-Hellman (DH), elliptic curve cryptography (ECC) algorithms, etc., to encrypt and/or decrypt secret messages, digital signature algorithms (DSA) to authenticate messages, and so on. Cryptographic algorithms typically involve modular arithmetic operations, in which integers are wrapped around a circle of length P (the ring $Z_P$), so that any two numbers that differ by P (or any other integer of P) are treated as the same number.

An RSA cryptographic application may generate a private/public keys by selecting a pair of large prime numbers, e.g., $p_1$ and $p_2$, selecting a public (encryption) exponent e and then computing a secret (decryption) exponent d that is based on the public (encryption) exponent e and the selected numbers $p_1$ and $p_2$. The numbers e and $P=p_1 \cdot p_2$ may subsequently be revealed to other actors as part of the public key while $p_1$, $p_2$, and d are stored (as the secret private key) by the recipient of future secret communications. A sender may encrypt a plaintext message m by computing a ciphertext message c using modular exponentiation, $c=m^e$ mod P, and communicate c (e.g., publicly) to the recipient. The recipient may then decrypt the ciphertext by applying another modular exponentiation, $m=c^d$ mod P. The original plaintext message is recovered provided that the value of the decryption exponent d is selected in such a way that the encryption and decryption exponents are inverse of each other, $e \cdot d = 1$, modulo a suitably chosen number, e.g., $(p_1-1)(p_2-1)$.

In ECC applications, numbers are associated with points on elliptic curves (e.g., Weierstrass curves) with special rules defined for various arithmetic operations, e.g., addition, subtraction, doubling, multiplication, etc. The nature of the elliptic curves ensures that a product of two large values (points on an elliptic curve) $Y = X \cdot K$ can be practically anywhere on the curve. As a result, finding the discrete logarithm of a random elliptic curve element with respect to a publicly known base point is computationally infeasible.

An exponentiation operation $Y=X^K \mod P$ (e.g., in RSA applications) or a point multiplication operation $Y=X \cdot K$ e.g., (in ECC applications) may be easily performed via K (point) multiplication or addition iterations, but values of K (e.g., cryptographic key values) are typically large numbers. Accordingly, to speed up the computations, various ladder-type algorithms may be used, such as Montgomery ladder, double-and-add ladder, Joye double-and-add ladder, etc., that perform the exponentiation much faster, in approximately $\log_2 K$ iterations. For example, in the Montgomery ladder exponentiation algorithm, two registers, e.g., R0 and R1, may be used to store an accumulator value and an auxiliary value. More specifically, prior to execution of the Montgomery ladder, a value 1 may be stored in the accumulator register, $R0 \leftarrow 1$ and the base of the exponential function may be stored in the auxiliary register, $R1 \leftarrow X$. During each iteration, a value $k_j$ associated with the iteration determines which register's value is squared, whereas the other register's new value is obtained by multiplication of the values stored in both registers.

As an illustration, raising a base number X to power K=22 (having the binary value $(k_4 k_3 k_2 k_1 k_0)=10110$, may be performed in five iterations, with the first iteration ($k_4=1$) squaring the number stored in R1: $R0 \leftarrow 1 \cdot X=X$, $R1 \leftarrow X^2$, the second iteration ($k_3=0$) squaring the number stored in R0: $R0 \leftarrow X^2$, $R1 \leftarrow X \cdot X^2 = X^3$, the third iteration ($k_2=1$) squaring the number stored in R1: $R0 \leftarrow X^2 \cdot X^3 = M^5$, $R1 \leftarrow X^6$, the fourth iteration ($k_1=1$) squaring the number stored in R1: $R0 \leftarrow X^5 \cdot X^6 = X^{11}$, $R1 \leftarrow X^{12}$, and the final iteration ($k_0=0$) squaring the number stored in R0: $R0 \leftarrow X^{22}$, $R1 \leftarrow X^{11} \cdot X^{12} = X^{23}$. (Each of the above multiplication and squaring operations may be a modular operation modulo P.) The output of the exponentiation operation is then given by the number in the accumulator register R0, e.g., $X^{22}$, in this example. The exponentiation is, therefore, performed using only $[\log_2 22]+1=5$ iterations (with the brackets [.] indicating taking the integer value of the number therein).

The Montgomery ladder is balanced across the iterations, in the sense that, regardless of the value of $k_j$, each iteration performs one squaring operation and one multiplication operation. Nonetheless, the Montgomery ladder may be susceptible to side-channel attacks since each iteration involves an execution of a branching instruction (e.g., if $k_j=0$ . . . else . . . ). As the assembly code selects between execution of instructions in different lines (in response to a value of $k_j$) of the code, the power consumption varies depending on which line is selected following the branching instruction. This represents a security leakage that can be exploited by an attacker.

Aspects and embodiments of the present disclosure address these and other technological challenges by eliminating branching instructions in execution of ladder computations (e.g., Montgomery ladders) that are used in cryptographic applications (e.g., RSA, ECC applications, etc.). The embodiments described below illustrate devices, techniques, and an instruction set architecture for deploying conditional exchange operations that significantly reduce power differences and, correspondingly, leakage of secret information during ladder execution. For example, in one embodiment, at the start of each iteration, the conditional swapping R0↔R1 is performed that is contingent on the occurrence of the condition $k_j=1$, followed by unconditional execution of the squaring operation $R0 \leftarrow (R0)^2$ and the multiplication operation $R1 \leftarrow R0 \cdot R1$, and concluding with another swapping R0↔R1. In another embodiment, to reduce the number of conditional exchanges, the conditional exchange is performed just once per iteration contingent of a value of $k_j$ being different from a value $k_{j+1}$ (or $k_{\pm 1}$) of the bit adjacent to the bit $k_j$. In yet another embodiment, to balance execution of iterations where the conditional exchange R0↔R1 is performed with execution of iterations where the conditional exchange is not performed, an additional dummy exchange is performed in those iterations where the conditional exchange R0↔R1 is not performed. Such a dummy exchange further reduces power consumption imbalances between $k_j=1$ and $k_j=0$ iterations of the ladder(s) and hinders attacker's attempts to correlate power differences to different values of bits of the secret information.

The advantages of the disclosed devices and techniques include, but are not limited to, increased resistance of ladder computations to SPA, DPA, and other side-channel attacks, and significant improvement of security of sensitive and confidential data during encryption, decryption, authentication, etc., of such data.

System Architecture

FIG. 1 is a block diagram of an example computer device 100 that performs balanced ladder computations for enhanced protection against side-channel attacks, in accordance with at least some embodiments. Example computer device 100 depicted in FIG. 1 may be a desktop computer, a tablet, a smartphone, a server (local or remote), a thin/lean client, a cloud computing node, a card reader, a wireless sensor node, an Internet-of-Things (IoT) node, an embedded system dedicated to one or more specific applications, and so on. One or more applications 102 may be executed on computer device 100.

Application(s) 102 supported by computer device 100 may include machine-learning application(s), graphics application(s), computational application(s), cryptographic application(s) (such as authentication, encryption, decryption, secure storage application(s), etc.), embedded application(s), external application(s), or any other types of application(s) that may be executed by computer device 100. Application(s) 102 may be instantiated on the same computer device 100, e.g., by an operating system executed by computer device 100. Alternatively, application(s) 102 may be external application(s) instantiated by a guest operating system supported by a virtual machine monitor (hypervisor) operating on the computer device 100. In some embodiments, the external application(s) may reside on a remote access client device or a remote server (not shown), with the computer device 100 providing cryptographic support for the client device and/or the remote server.

The computer device 100 may include one or more processors 110. "Processor" refers to any device capable of executing instructions encoding arithmetic, logical, or I/O operations. In one illustrative example, a processor may follow the Von Neumann architectural model. Processor 110 may include a central processing unit (CPU) 112, which may have any number of arithmetic logic units (ALUs), floating-point units (FPUs), control units, registers, and so on. CPU 112 may be executing at least some operations of application (s) 102. CPU 112 may include one or more cores having access to a single or multi-level cache 114. In some embodiments, each core may execute instructions to run a number of threads, also known as logical cores. Various logical cores may be assigned to one or more application(s) 102, although more than one logical core may be assigned to a specific application 102 for parallel processing. A multi-core CPU 112 may simultaneously execute multiple instructions. A single-core CPU 112 may typically execute one instruction at a time (or process a single pipeline of instructions). CPU 112 may be implemented as a single integrated circuit, two or more integrated circuits, or may be a component of a multi-chip module.

In some embodiments, some operations of application(s) 102 may be executed by one or more graphics processing units (GPUs) 116. GPU 116 may include multiple cores, each core being capable of executing multiple threads. Each core may run multiple threads concurrently (e.g., in parallel). In some embodiments, GPU threads may have access to thread-specific (private) GPU registers. Additionally, one or more shared GPU registers may be accessed by all threads of the GPU core. In at least one embodiment, each GPU core may include a scheduler to distribute computational tasks and processes among different GPU threads. GPU 116 may also have a dispatch unit to implement scheduled tasks on appropriate GPU threads using correct private and shared GPU registers. In some embodiments, GPU 116 may have a cache 118, access to which may be shared by multiple GPU cores. In some embodiments, CPU 112 may execute processes that involve serial computational tasks whereas GPU 116 may execute tasks that are amenable to parallel processing. In some embodiments, application(s) 102 may determine which processes are to be executed on GPU 116 and which processes are to be executed on CPU 112. In other embodiments, CPU 112 may determine which processes are to be executed on GPU 116 and which processes are to be executed on CPU 112. In some embodiments, processor 110 may include one or more application-specific integrated circuits (ASICs), field-programmable gate arrays (FPGAs), finite state machines (FSMs), and the like.

Processor 110 may have access, e.g., over a system bus 108, to one or more system memory 140 devices. System memory 140 may refer to any volatile or non-volatile memory and may include a read-only memory (ROM) 142, a random-access memory (RAM) 144, as well as (not shown) electrically erasable programmable read-only memory (EEPROM), flash memory, flip-flop memory, or any other device capable of storing data. RAM 144 may be a dynamic random-access memory (DRAM), synchronous DRAM (SDRAM), a static memory, such as static random-access memory (SRAM), and the like. In some implementations, processor 110 and the system memory 140 may be implemented as a single controller, e.g., as an FPGA.

Processor 110 may include an accelerator circuit 130 (accelerator co-processor, accelerator engine). One or more application(s) 102 may perform cryptographic operations on processor 110 with one or more functions, e.g., ladder computations functions 103, performed by accelerator circuit 130. Accelerator circuit 130 may include various accelerator function units, e.g., ladder computations unit 133 to implement computations of ladder computations functions 103 of application(s) 102, as described in more detail below. Accelerator circuit 130 may be communicatively coupled to CPU 112 and/or GPU 116 via accelerator circuit interface (AC interface) 120. In some embodiments, accelerator circuit 130 may perform a portion of cryptographic computations executed by processor 110. For example, CPU 112 (and/or GPU 116) may be executing an RSA algorithm while performing a number of (modular) exponentiations to encrypt and/or decrypt various plaintext and/or ciphertext messages using ladder-type techniques. In the course of performing a ladder exponentiation for a predetermined modulus P, e.g., $Y=X^K \mod P$, CPU 112 (and/or GPU 116) may provide a value of the first input number X and the second input number K to accelerator circuit 130, and accelerator circuit 130 may compute the output value Y and return the computed value to CPU 112 (and/or GPU 116). In another example, CPU 112 (and/or GPU 116) may be executing an ECC algorithm while performing a number of (modular) multiplications. In the course of performing a ladder multiplication, e.g., $Y=R \cdot K \mod P$, for a specific modulus P, CPU 112 (and/or GPU 116) may provide a value of the first input number Rx, second input Ry, and the third input number K to accelerator circuit 130, and accelerator circuit 130 may compute the output value Y and return the computed value to CPU 112 (and/or GPU 116).

Accelerator circuit 130 may include a decode unit 132 (also known as a decoder), which may be coupled to an instruction fetch unit (not depicted in FIG. 1). Decode unit 132 may decode instructions, and generate one or more micro-operations, micro-code entry points, microinstructions, other instructions, or other control signals, which are decoded from, or which otherwise reflect, or are derived from, the original instructions. Decode unit 132 may be implemented using various mechanisms, e.g., look-up tables, hardware implementations, programmable logic arrays (PLAs), microcode read only memories (ROMs), and the like. Decode unit 132 may be coupled to an execution unit 134, which may include a scheduler unit (not depicted in FIG. 1). Decode unit 132 and execution unit 134 may be coupled to one or more registers 138 via a memory access unit 136. Each register 138 may store one or more different data types, such as scalar integer, scalar floating point, packed integer, packed floating point, vector integer, vector floating point, etc., status (e.g., an instruction pointer that is the address of the next instruction to be executed), etc.

In some embodiments, decode unit 132 may receive instructions from CPU 112 (and/or GPU 116) that may include an identification of the operation to be performed (e.g., modular division, modular inversion, etc.) together with the input values (e.g., X, K and/or P). Decode unit 132 may store the received input values in registers 138. Decode unit 132 may also store (or access previously stored) some additional numbers (e.g., memory pointers), as described in more detail below. Decode unit 132 may then use a decoding circuitry (e.g., one or more multiplexers, as described in more detail below in conjunction with FIG. 3A and FIG. 3B) to determine one or more operations to be performed on the input values by execution unit 134, such as multiplication, squaring, addition, doubling, etc. operations, and the like. During execution of the operations by execution unit 134, intermediate values may be stored in registers 138. After the completion of the modular division or inversion computations, the final output may be moved to CPU cache 114 (or GPU cache 118). In some embodiments, after completion of the computations, memory access unit 136 may provide to CPU 112 (or GPU 116) an identification of a register 138 storing the final output and CPU 112 (or GPU 116) may fetch the final result directly from the corresponding register.

The computer device 100 may further include an input/output (I/O) component 104 to facilitate connection of computer device 100 to various peripheral hardware devices (not shown) such as card readers, terminals, printers, scanners, IoT devices, and the like. Computer device 100 may further include a network interface 106 to facilitate connection to a variety of networks (Internet, wireless local area networks (WLAN), personal area networks (PAN), public networks, private networks, etc.), and may include a radio front end module and other devices (amplifiers, digital-to-analog and analog-to-digital converters, dedicated logic units, etc.) to implement data transfer to/from computer device 100.

The following operations represent one possible embodiment of a Montgomery ladder exponentiation that avoids the use of branching "if . . . else . . . " instructions.

TABLE 1

Montgomery ladder with multiple conditional exchanges per iteration

Input: X, K = $(k_{n-1}, ..., k_0)_2$, P, n; // n is the bit width of X, K, P;
Output: Y = X^K mod P
1. R0 := 1; R1 := X;
2. for j = n−1 downto 0 do
3.    R0 ←→ R1 if ($k_j$ = 1);
4.    R0 := (R0)² mod P; R1 := R0 × R1 mod P;
5.    R0 ←→ R1 if ($k_j$ = 1);
6. endfor
7. return R0

In the embodiment of TABLE 1, at the start of each iteration (line 3), the conditional swapping R0↔R1 is performed that is contingent on the occurrence of the condition $k_j$=1, followed by unconditional execution (line 4) of the squaring operation R0←(R0) 2 and the multiplication operation R1←R0·R1. Each iteration concludes (line 5) with another conditional swapping R0↔R1 that is also performed contingent on the occurrence of the condition $k_j$=1. The final output, Y=$X^K$ mod P, represents the exponentiated input X, and is read from register R0 (line 7). Although, for brevity and consensus, the operations in TABLE 1 indicate swapping of values stored in registers R0 and R1, in some embodiments only the pointers to the respective memory locations that store values R0 and R1 are swapped, whereas the values themselves remains stored in the respective memory locations (e.g., as described below in conjunction with FIG. 3A and FIG. 3B).

The following operations represent another possible embodiment of a Montgomery ladder exponentiation that avoids the use of branching "if . . . else . . . " instructions while deploying only one conditional exchange operation per iteration.

TABLE 2

Montgomery ladder with a single conditional exchange per iteration

Input: X, K = $(k_{n-1}, ..., k_0)_2$, P, n; // n is the bit width of X, K, P;
Output: Y = X^K mod P
1. R0 := 1; R1 := X; $k_n$=0; $k_{-1}$=0
2. for j = n−1 downto 0 do
3.    R0 ←→ R1 if ($k_j$ XOR $k_{j+1}$ = 1);
4.    R0 := (R0)² mod P; R1 := R0 × R1 mod P;
5. endfor
6. R0 ←→ R1 if ($k_0$ XOR $k_{-1}$ = 1);
7. return R0

The embodiment of TABLE 2, defines two additional bits, $k_n$ and $k_{-1}$ that have the same value (e.g., zero) and are concatenated to the actual bits of the input exponent K: ($k_n k_{n-1}$ . . . $k_0 k_{-1}$). The conditional swapping (line 3) is performed contingent on the bit $k_j$ of j-th iteration being different from the bit $k_{j+1}$ of the previously executed iteration (or the bit $k_n$, for the first iteration).

Figure 2A:
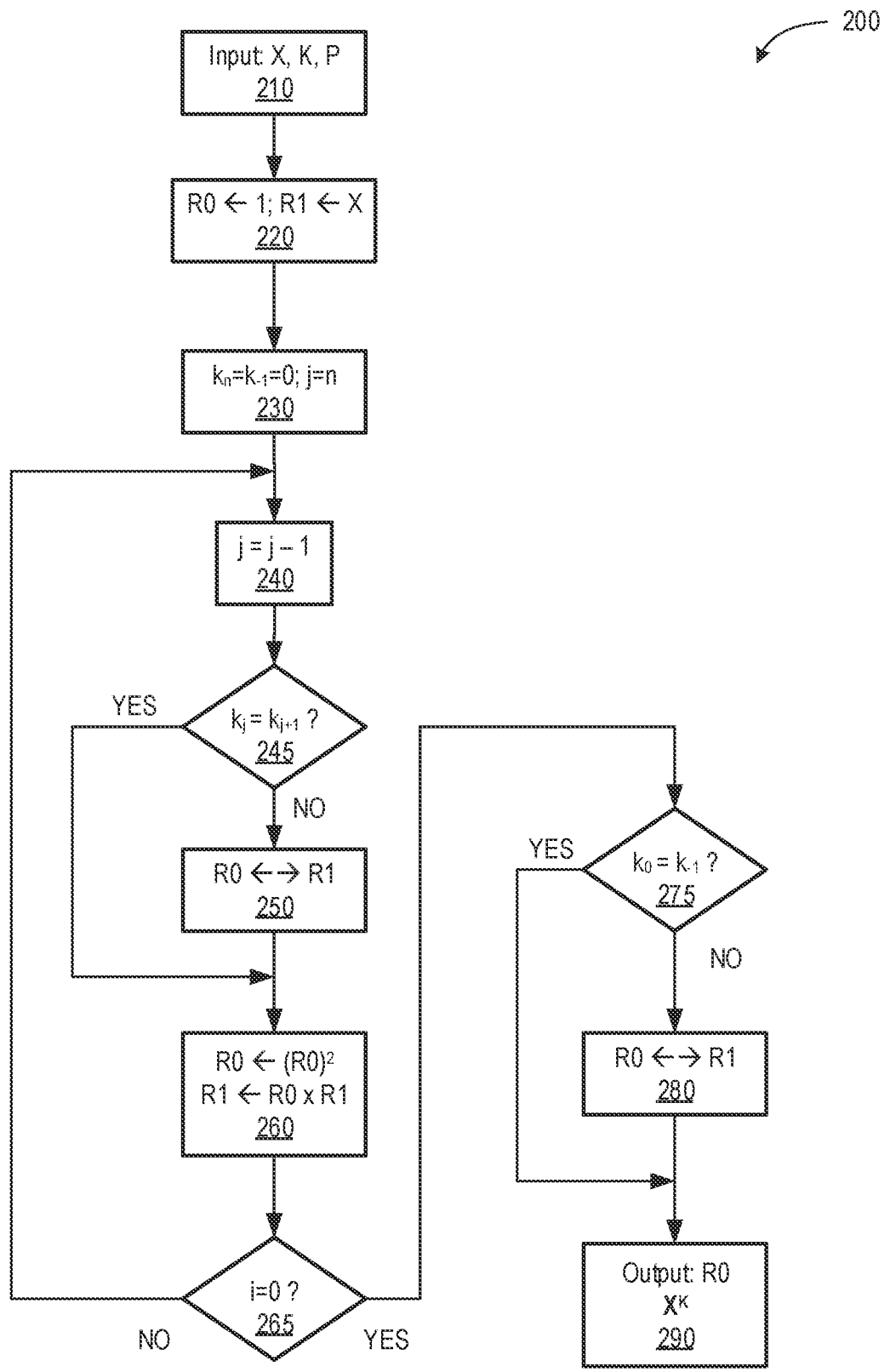
FIG. 2A depicts a flowchart illustrating example operations of a Montgomery ladder exponentiation with balanced iterations for enhanced protection against side-channel attacks, in accordance with at least some embodiments.

FIG. 2A depicts a flowchart illustrating example operations 200 of a Montgomery ladder exponentiation with balanced iterations for enhanced protection against side-channel attacks, in accordance with at least some embodiments. Example operations 200 correspond to the operations of TABLE 2 and may be implemented by various units of accelerator circuit 130. In some implementations, example operations 200 may be implemented by a combination of CPU 112 (GPU 116) and accelerator circuit 130, by a combination of accelerator circuit 130 and software executed by CPU 112 (GPU 116), or purely by software executed by CPU 112 (GPU 116). More specifically, the input (block 210) into operations 200 may include a base X of the exponential function, an exponent K of the exponential function, and modulus P that defines the size of the ring on which various arithmetic operations are defined. At block 220, a first register R0 is seeded with value 1, and the base number X is stored in a second register R1. At block 230, the additional bits of the exponent K are defined (added), e.g., by concatenating bit 0 to the left of the most significant bit of the exponent K and another bit 0 to the right of the least significant bit of the exponent K. Furthermore, at block 230, an iteration counter can be initialized with value j=n. At block 240, the iteration counter is decremented and the first iteration is started, at decision-making block 245, with computing the value c=$k_{n-1}$ XOR $k_n$ of a control bit c and comparing the control bit c to 0. If the value of the control bit is, c=1, swapping R0↔R1 is performed at block 250 and the operations continue to block 260. In some embodiments, swapping may be performed by swapping identifiers (pointers, memory addresses) of the memory locations that store values R0 and R1 (without swapping the actual content of the memory locations). In the instances of the control bit being zero, c=0, no swapping is performed and the operations 200 proceed directly to block 260 that updates the values stored in registers R0 and R1: R0←(R0)², R1←R0·R1.

At block 265, the operations 200 determine if the last iteration has been completed. Unless the current bit j has value 0, the operations return to block 240 where the iteration counter is decremented and the next set of blocks 240-260 is performed. When the last iteration has been performed (j=0), a final control bit value c=$k_0$ XOR $k_{-1}$ is computed at block 275 and compared to 0. If the value of the control bit is, c=1, the final swapping R0↔R1 is performed at block 280 and the operations continue to block 290 where the output Y=$X^K$ mod P is fetched from register R0. If the value of the final control bit is zero, c=0, no swapping is performed and, at block 290, the output Y is fetched from register R0.

Figure 2B:
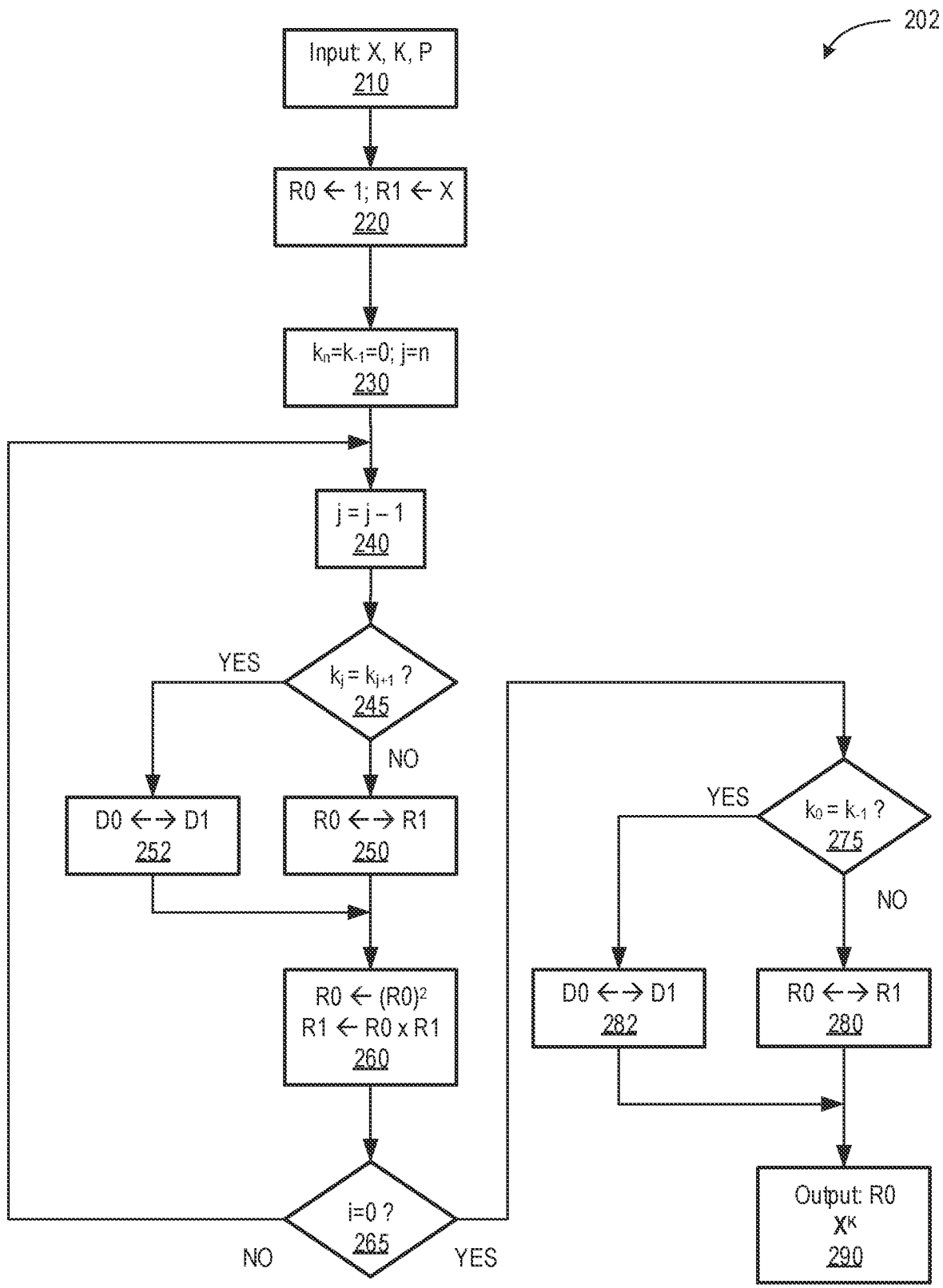
FIG. 2B depicts a flowchart illustrating example operations of a Montgomery ladder exponentiation with balanced iterations and dummy swapping for enhanced protection for enhanced protection against side-channel attacks, in accordance with at least some embodiments.

FIG. 2B depicts a flowchart illustrating example operations 202 of a Montgomery ladder exponentiation with balanced iterations and dummy swapping for enhanced protection for enhanced protection against side-channel attacks, in accordance with at least some embodiments. Example operations 202 are further illustrated in TABLE 3 and may be implemented by the same (or similar) processing units that are capable of performing operations 202.

TABLE 3

Montgomery ladder with dummy conditional exchanges per iteration

Input: X, K = $(k_{n-1}, ..., k_0)_2$, P, n; // n is the bit width of X, K, P;
Output: Y = X^K mod P
1. R0 := 1; R1 := X; $k_n$=0; $k_{-1}$=0
2. for j = n−1 downto 0 do
3.    R0 ←→ R1 if ($k_j$ XOR $k_{j+1}$ = 1);
4.    D0 ←→ D1 if ($k_j$ XOR $k_{j+1}$ = 0);
5.    R0 := (R0)² mod P; R1 := R0 × R1 mod P;
6. endfor
7. R0 ←→ R1 if ($k_0$ XOR $k_{-1}$ = 1);
8. D0 ←→ D1 if ($k_0$ XOR $k_{-1}$ = 0);
9. return R0

The operations 202 illustrated in FIG. 2B include swapping of dummy values stored in registers D0 and D1 at blocks 252 and 282 in the instances when conditions for execution of blocks 250 and 282, respectively, are not satisfied, e.g., in the instances when control bit value is zero, c=0.

As referenced in relation to TABLE 1 above and further described below in conjunction with FIG. 3A and FIG. 3B, in some embodiments, only dummy pointers are swapped at blocks 252 and 282. In such embodiments, no actual registers are allocated for storing actual dummy values D0 and D1.

Figure 3A:
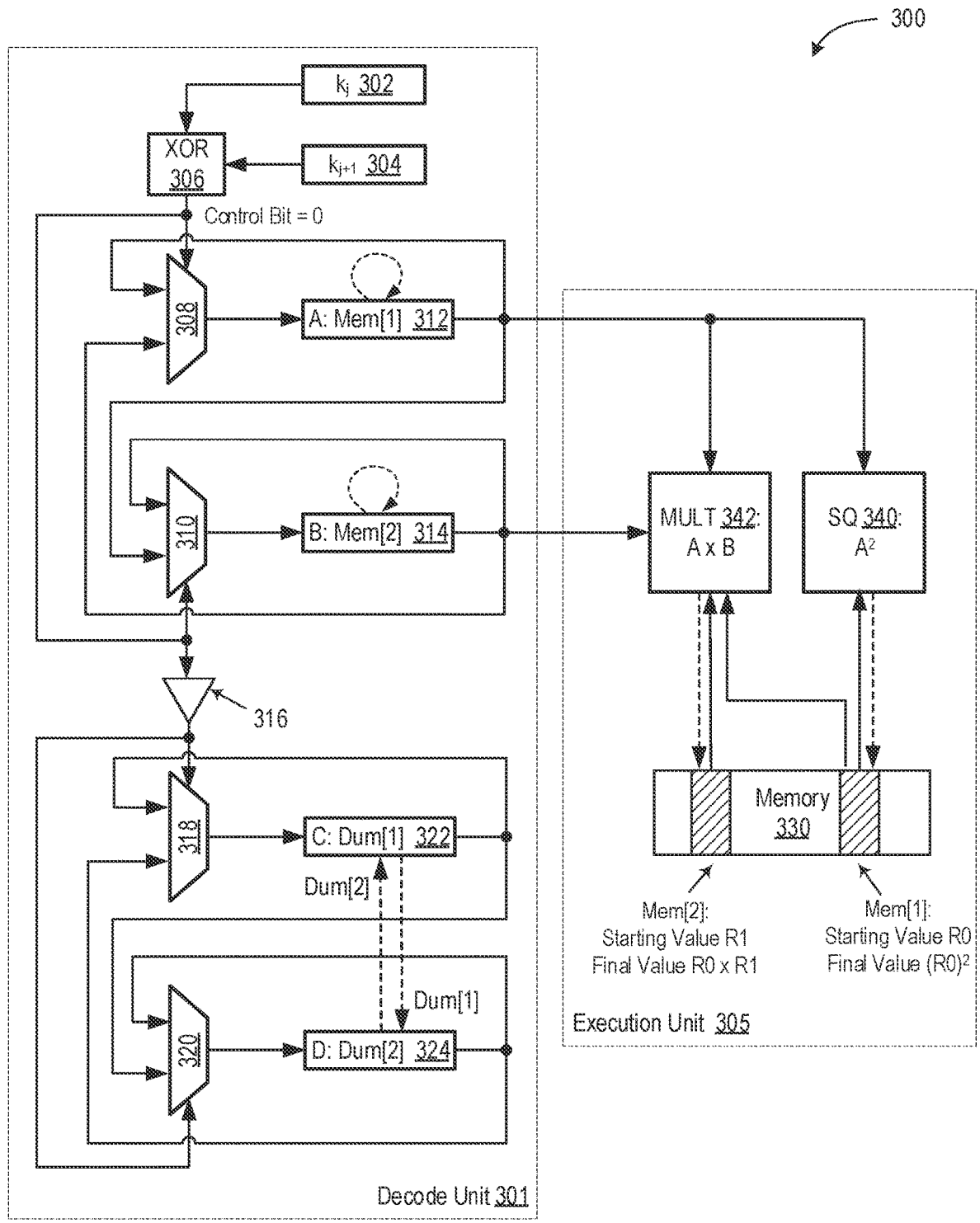
FIGS. 3A-B illustrate an example accelerator circuit capable of performing Montgomery ladder exponentiation and other ladder computations with balanced iterations for enhanced protection against side-channel attacks, in accordance with at least some embodiments.
Figure 3B:
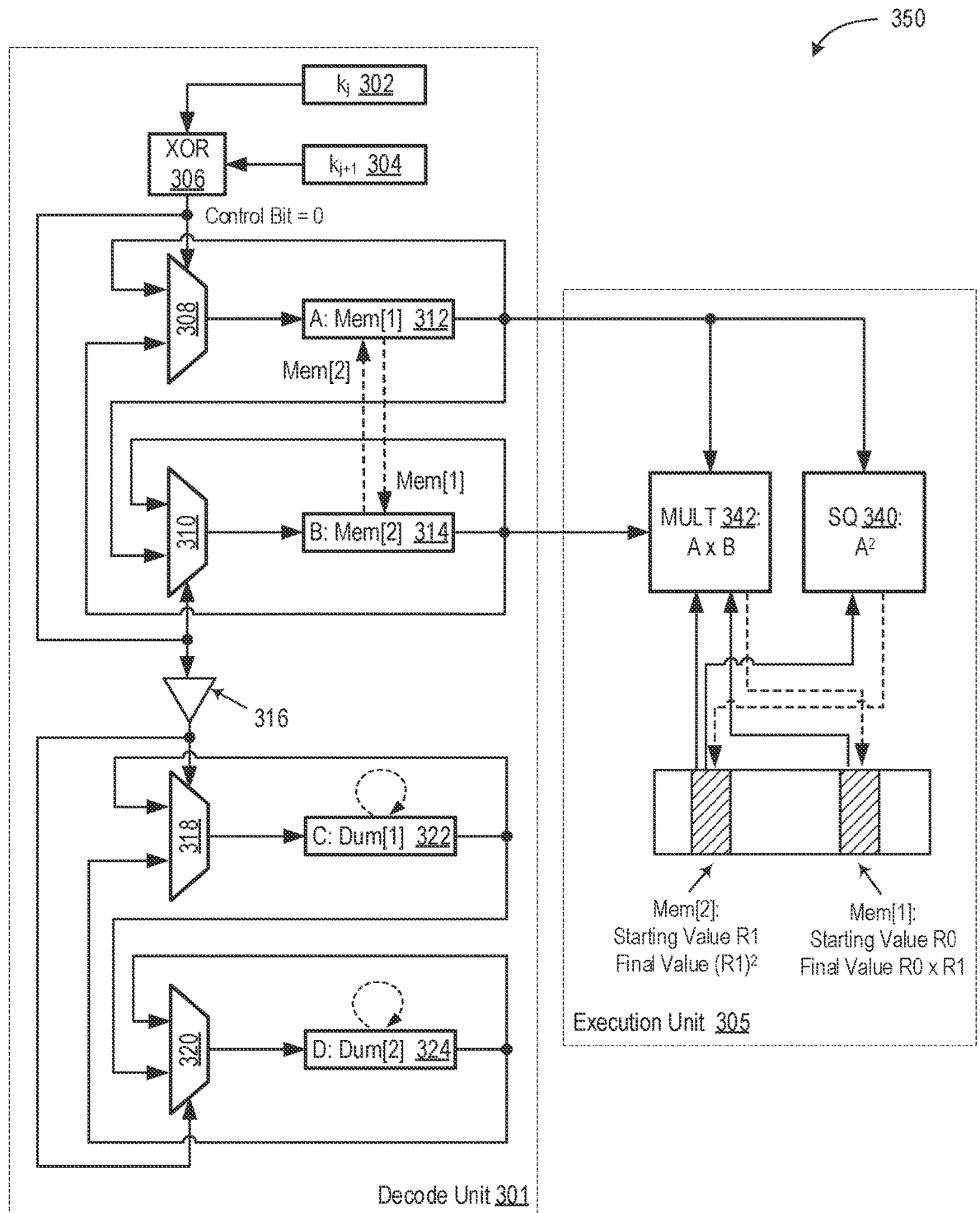

FIGS. 3A-B illustrate an example accelerator circuit capable of performing Montgomery ladder exponentiation and other ladder computations with balanced iterations for enhanced protection against side-channel attacks, in accordance with at least some embodiments. FIG. 3A illustrates processing 300 of ladder iterations for which control bit value $c=k_j$ XOR $k_{j+1}$ has a first value, e.g., value 0, where swapping R0↔R1 is not performed. More specifically, during processing of j-th iteration, the bit $k_j$ may be retrieved from its storage location 302 while the bit $k_{j+1}$ may be retrieved from its storage location 304. The storage locations 302 and 304 may be within the same register storing the exponent K (or, the extended exponent K with additional bits $k_n$ and $k_{-1}$ concatenated to the two ends of the exponent K). The retrieved bits may be processed by an XOR circuit 306 (a modulo 2 addition circuit) to obtain the control bit value c=0 indicative of the retrieved bits $k_j$ and $k_{j+1}$ being the same.

The control bit value c=0 is then used as the selection signal for multiplexers 308 and 310 connected to register A 312 and register B 314. Multiplexer 308 receives a first input that is equal to the value stored in register A 312 and a second input that is equal to the value stored in register B 314. Responsive to the control bit value c=0, multiplexer 308 outputs the value equal to the first input and, therefore, re-saves (as indicated schematically with a circular arrow above register A 312) the value previously stored in register A 312.

Similarly, multiplexer 310 receives a first input that is equal to the value stored in register B 314 and a second input that is equal to the value stored in register A 314. Responsive to the control bit value c=0, multiplexer 310 outputs the value equal to the first input and re-saves (as indicated schematically with a circular arrow above register B 314) the value previously stored in register B 314.

An inverter 316 inverts the control bit value and sends the inverted control bit value c=1 as the control signals to multiplexers 318 and 320 connected to register C 322 and register D 324. Multiplexer 318 receives a first input that is equal to the value stored in register C 322 and a second input that is equal to the value stored in register D 324. As a result, responsive to the inverted control bit value c=1, multiplexer 318 outputs the value that is equal to the second input and overwrites the previously stored value in register C 322 with the value previously stored in register D 324 (as indicated schematically with the upward arrow in FIG. 3A).

Similarly, multiplexer 320 receives a first input that is equal to the value stored in register D 324 and a second input that is equal to the value stored in register C 322. As a result, responsive to the inverted control bit value c=1, multiplexer 320 outputs the value equal to the second input and overwrites the previously stored value in register D 324 with the value previously stored in register C 322 (as indicated schematically with the downward arrow in FIG. 3A).

Prior to performing the operations described, register A 312 may have been storing a pointer to a memory location, Mem[1], storing a current accumulator value R0. Similarly, register B 312 may have been storing a pointer to a memory location, Mem[2], storing a current auxiliary value R1. Additionally, register C 322 may have been storing a dummy pointer Dum[1] and register D 324 may have been storing a dummy pointer Dum[2]. After the operations described above, register A 312 may still store the pointer Mem[1], register B 312 may still store the pointer Mem[2], while register C 322 may be storing the dummy pointer Dum[2] and register D 324 may be storing the dummy pointer Dum[1]. In other words, swapping of the stored memory pointers has been performed between register C 322 and register D 324, but not between register A 312 and register B 314.

The pointer stored in register A 312 (e.g., Mem[1]) may then be used by the accelerator circuit to fetch an operand A from memory 330 (the right solid vertical arrow) for an SQ 340 circuit that performs squaring of the fetched operand A (e.g., R0). After performing the squaring operation, SQ 340 circuit may return the computed value $(R0)^2$ to the memory location identified by the pointer (e.g., Mem[1]) stored in register A 312 (as indicated with the right dashed vertical arrow). As a result, the value $(R0)^2$ replaces value R0 in the memory location identified by the pointer Mem[1].

The pointer stored in register B 314 (e.g., Mem[2]), as well as the pointer stored in register A 312 (e.g., Mem[1]), may be used by the accelerator circuit to fetch an operand B, as well as operand A, from memory 330 (the left solid vertical arrow, as well as the broken solid arrow, in FIG. 3A) for MULT 342 circuit that performs multiplication the fetched operand A (e.g., R0) and operand B (e.g., R1). After performing the multiplication operation, MULT 342 circuit may return the computed value R0·R1 to the memory location identified by the pointer (e.g., Mem[2]) stored in register B 314 (as indicated with the left dashed vertical arrow). As a result, the value R0·R1 replaces value R1 in the memory location identified by the pointer Mem[2].

FIG. 3B illustrates processing 350 of ladder iterations for which control bit value $c=k_j$ XOR $k_{j+1}$ has a second value, e.g., value 1, where swapping R0↔R1 is performed. As illustrated in FIG. 3B, the control bit value c=1 is used as a selection signal for multiplexers 308 and 310, causing multiplexer 308 to output the value equal to the second input, e.g., pointer Mem[2], and to overwrite the previously stored value, e.g., Mem[1], in register A 312 with the pointer Mem[2] (as indicated schematically with the upward arrow in FIG. 3B). Similarly, multiplexer 310 outputs the value equal to the pointer Mem[1] and overwrites the previously stored value, e.g., Mem[2], in register B 314 with pointer Mem[1] (as indicated schematically with the downward arrow in FIG. 3B).

Since inverter 316 inverts the control bit value and sends the inverted control bit value c=0 as to multiplexers 318 and 320, multiplexers 318 and 320 output the signals that maintain the values previously stored in register C 322 (e.g., Dum[1]) and register D 324 (e.g., Dum[2]), respectively, as indicated schematically with the circular arrows in FIG. 3B. As a result, swapping of the stored memory pointers is performed between register A 312 and register B 314 but not between register C 322 and register D 324.

The pointer stored in register A 312 (e.g., Mem[2]) may then be used to fetch operand A from memory 330 (as depicted with a corresponding broken solid arrow). The squaring circuit SQ 430 performs squaring of the fetched operand A (e.g., R1). After performing the squaring operation, circuit SQ 430 may return the computed value $(R1)^2$ to the memory location identified by the pointer (e.g., Mem[2]) stored in register A 312 (as indicated with the corresponding broken dashed arrow). As a result, the value $(R1)^2$ replaces value R1 in the memory location identified by the pointer Mem[2].

The pointer stored in register B 314 (e.g., Mem[1]) together with the pointer stored in register A 312 (e.g., Mem[2]) are used by the multiplication MULT 342 circuit to fetch operands A (e.g., R1) and operand B (e.g., R0), respectively from memory 330 (the left solid vertical arrow and the broken solid arrow, in FIG. 3B). MULT 342 circuit may compute the product R0 R1 and store the computed product in the memory location identified by the pointer (e.g., Mem[1]) stored in register B 314 (as indicated with the right dashed vertical arrow). As a result, the value R0·R1 replaces value R0 in the memory location identified by the pointer Mem[1].

Consequently, operations of a ladder iteration illustrated in FIG. 3A and FIG. 3B amount to: (1) accessing the value R0 initially stored in memory location Mem[1] and the value R1 initially stored in memory location Mem[2], (2) performing a squaring operation and a multiplication operation using the accessed numbers, and (3) storing the value $(R0)^2$ in memory location Mem[1] and the value R0·R1 in memory location Mem[2] (FIG. 3A), or storing the value $(R1)^2$ in memory location Mem[2] and the value R0·R1 in memory location Mem[1] (FIG. 3B), depending on the control bit value. Other iterations of the Montgomery ladder exponentiation computations are performed similarly, based on the values of the control bits for the respective iterations. Any of the multiplication and squaring operations, described in conjunction with FIGS. 3A-B, may be modular operations.

In some embodiments, to ensure that energy consumption is balanced across iterations in which the control bit value is 1 and the iterations in which the control bit value is 0, the dummy pointers stored in register C 322 and register D 324 may have a hamming distance that is the same as the hamming distance of real pointers stored in register A 312 and register B 314. In some embodiments, the hamming distance may be equal to one.

Ladder computations described above in conjunction with FIGS. 2A-B and FIGS. 3A-B are illustrated using the Montgomery ladder as an example, but it should be understood that other ladder computations may be performed using similar techniques. For example, the computations of the Joye double-and-add ladder may be performed in the opposite direction, starting from the least significant bit and iteratively processing more significant bits. The initial registers may be seeded similarly to the Montgomery ladder, R0←1, R1←X whereas computations may be performed as follows. During each of n iterations, a value stored in one of the registers R0 and R1 remains unchanged, whereas the value stored in the other register is squared and multiplied by the value stored in the first register. The register whose content is unchanged is determined by the value of the bit $k_j$; e.g., the value $k_{j=0}$ indicates that the number in the register R0 is unchanged: R0·R0, R1←$(R1)^2$·R0, while the value $k_{j=1}$ indicates that the number in the register R1 is unchanged: R0←$(R0)^2$·R1, R1←R1. In the Joye double-and-add ladder embodiments, a single multiplication circuit may be used in place of SQ 340 circuit and MULT 342 circuit, the single multiplication circuit squaring a first operand (e.g., R0 or R1) and then multiplying the result by the second operand (e.g., R1 or R0).

Ladder computations described above in conjunction with FIGS. 2A-B and FIGS. 3A-B are illustrated using the exponentiation computation, $Y=X^K$ mod P. Similar operations may be performed in the course of a point multiplication, $Y=X^K$ mod P. In such embodiments, SQ 340 circuit performs a doubling operation, e.g., 2A (instead of the squaring operation, e.g., $A^2$), and MULT 342 circuit performs addition operation A+B (instead of the multiplication operation, e.g., A·B).

Figure 4:
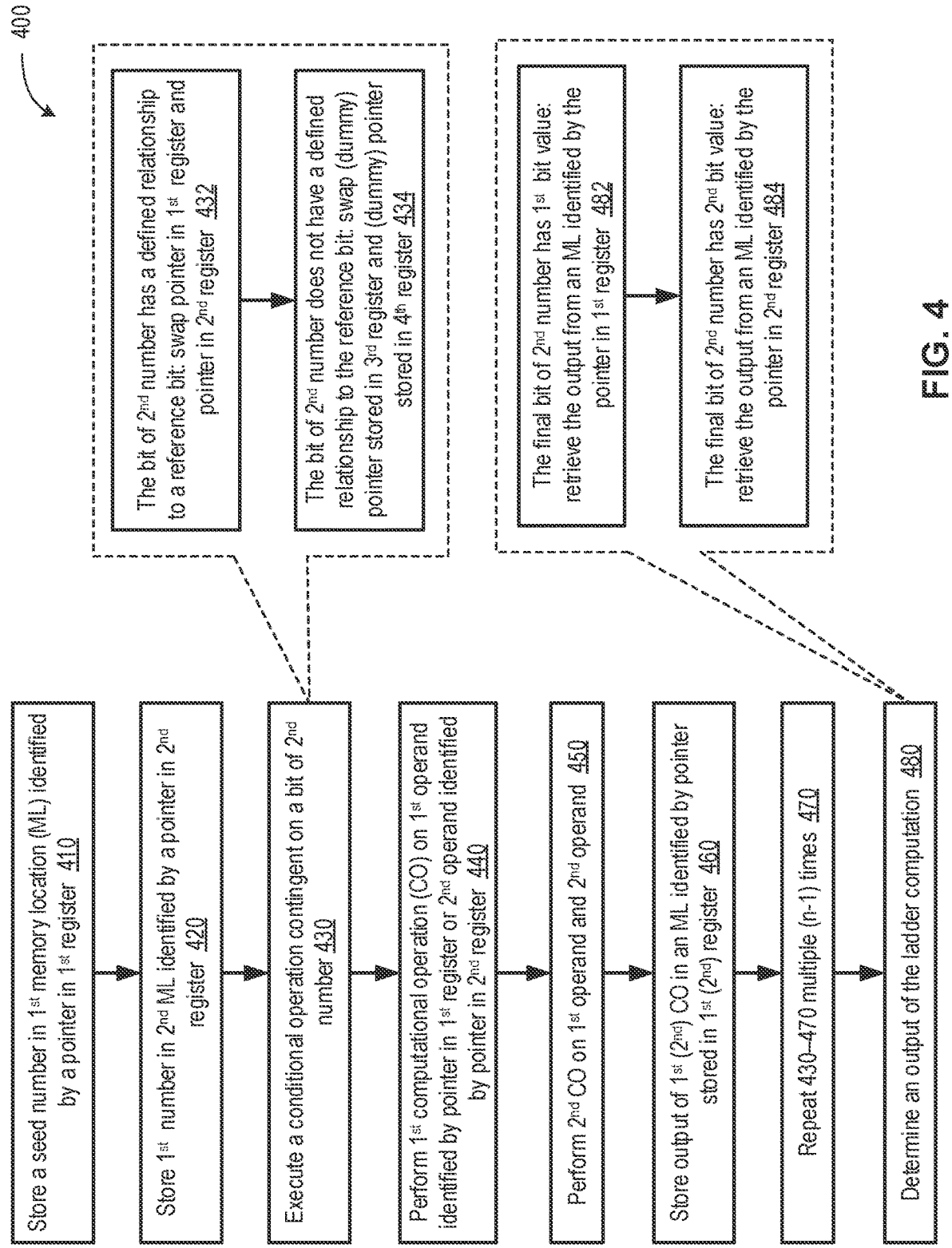
FIG. 4 is a flow diagram of an example method of ladder computations with balanced iterations for enhanced protection against side-channel attacks, in accordance with at least some embodiments.

FIG. 4 is a flow diagram of an example method 400 of ladder computations with balanced iterations for enhanced protection against side-channel attacks, in accordance with at least some embodiments. In some embodiments, method 400 may be performed by processing units that may include (or communicate with) one or more memory devices (e.g., registers). In some embodiments, method 400 may be performed responsive to instructions from CPU 112 (or GPU 116). In some embodiments, method 400 may be executed by one or more processing threads, each thread executing one or more individual functions, routines, subroutines, or operations of the methods. In some embodiments, processing threads implementing each of method 400 may be synchronized (e.g., using semaphores, critical sections, and/or other thread synchronization mechanisms). Alternatively, processing threads implementing method 400 may be executed asynchronously with respect to each other. Various operations of method 400 may be performed in a different order compared with the order shown in FIG. 4. Some operations of method 400 may be performed concurrently with other operations. In some embodiments, one or more operations shown in FIG. 4 may be optional.

Method 400 may be performed by a dedicated accelerator engine, e.g., accelerator circuit 130 of FIG. 1. In some embodiments, method 400 may be performed by a cryptographic engine configured to perform public/private key cryptographic computations, or by a general-purpose CPU (or GPU). Processing units that perform method 400 may include decode unit 132, execution unit 134, memory access unit 136, and other units of accelerator circuit 130 (e.g., fetch unit, scheduler unit, etc.). Ladder computations performed using method 400 may be a Montgomery ladder computation, a double-and-add ladder computation, or any other ladder computation. The ladder computations may involve a first number (e.g., X) and a second number (e.g., K) and may include exponentiation of the first number to a power of the second number (e.g., $Y=X^K$ mod P). In some embodiments, the ladder computations may involve computing a point multiplication product (e.g., Y=X·K mod P) of the first number and the second number, and/or any other suitable computations amenable to ladder-type processing.

In some embodiments, method 400 may include, at block 410, storing a seed number in a first memory location, the first memory location identified by a pointer stored in a first register. For example, a seed number R0=1 (in the instances of exponentiation) may be stored at a memory location that is identified by a pointer Mem[1]. As illustrated in FIG. 3A and FIG. 3B, the pointer Mem[1] may be stored in register A 312 and may identify a memory location in any suitable memory device (e.g., memory 330), including another register, a high-speed cache, RAM, etc. At block 420, method 400 may include storing a first number in a second memory location, the second memory location identified by a pointer stored in a second register. For example, a first number R1=X may be stored at a memory location that is identified by a pointer Mem[2]. As illustrated in FIG. 3A and FIG. 3B, the pointer Mem[2] may be stored in register B 314 and may identify a memory location in any suitable memory device, which may be the same as the memory device storing the first number or a different memory device.

Method 400 includes a plurality of iterations, e.g., n iterations, where n is the number of bits of the second number K. Each of the plurality of iterations may include a number of operations, including conditional operations, which may be contingent on a respective bit $k_j$ of a plurality of bits of the second number (e.g., $k_{n-1} \ldots k_0$). For example, as indicated with block 432 of the top callout portion of FIG. 4, responsive to identifying that the respective bit $k_j$ of the plurality of bits of the second number K has a defined relationship to a reference bit, the processing units may swap the pointer stored in the first register and the pointer stored in the second register (e.g., pointers Mem[1] and Mem[2]). For a first iteration of the plurality of iterations, e.g., iteration j=n-1 (if the first iteration is associated with the most significant bit of the second number) or iteration j=0 (if the first iteration is associated with the least significant bit of the second number), the reference bit (e.g., $k_n$ or $k_0$) may have a value that is equal to a first bit value, which in some embodiments may be zero, e.g., k n=0. For each subsequent iteration of the plurality of iterations, the reference bit may have a value that is equal to the value of a bit that is adjacent to the respective bit. For example, the reference bit in iteration j<n-1, may be bit $k_{j+1}$ for ladder operations that proceed from the most significant bit to the least significant bit of the second number. For ladder operations that proceed from the least significant bit to the most significant bit of the second number, the reference bit in iteration j may be bit $k_{j-1}$.

In some embodiments, the defined relationship between the respective bit $k_j$ and the reference bit, e.g., $k_{j+1}$, may be that the respective bit and the reference bit have different values. For example, an XOR (modulo 2 addition) circuit may be used to determine that $k_j$ XOR $k_{j+1}$=1. If, on the other hand, it is identified, at block 434, that the respective bit of the plurality of bits of the second number does not have the defined relationship to the reference bit, (e.g., that $k_j$ XOR $k_{j+1}$=0) the processing units performing method 400 may swap a pointer stored in a third register and a pointer stored in a fourth register. In some embodiments, the pointer stored in the third register (e.g., Dum[1]) and the pointer stored in the fourth register (e.g., Dum[1]) are dummy pointers. In some embodiments, a hamming distance between the pointer stored in the first register (e.g., Mem[1]) and the pointer stored in the second register (e.g., Mem[2]) is equal to a hamming distance between the pointer stored in the third register (e.g., Dum[1]) and the pointer stored in the fourth register (e.g., Dum[2]).

At block 440, method 400 may continue with the processing units performing a first computational operation on a first operand identified by the pointer stored in the first register (e.g., pointer Mem[1] or pointer Mem[2]). For example, the first operand may be the (current) accumulator value R0 (e.g., operand A in FIG. 3A) or the (current) auxiliary value R0 (e.g., operand A in FIG. 3B). In some embodiments, the first computational operation may be or include squaring the first operand (e.g., in the instances of exponentiation) or doubling the first operand (e.g., in the instances of multiplication). In some embodiments, the operand for the first computational operation may be a second operand identified by the pointer stored in the second register.

At block 450, method 400 may continue with the processing units performing a second computational operation. The second computational operation may include multiplication of the first operand and the second operand (e.g., in the instances of exponentiation) or addition of the first operand and the second operand (e.g., in the instances of multiplication). Both the first computational operation and the second computational operation may be modular computational operations.

At block 460, the processing units performing method 400 may store the output of the first computational operation in a memory location identified by the pointer stored in the first register. Similarly, the processing units performing method 400 may store the output of the second computational operation in a memory location identified by the pointer stored in the second register. In some embodiments, the output of the first computational operation may be stored in the memory location identified by the pointer stored in the second register and the output of the second computational operation may be stored in the memory location identified by the pointer stored in the first register.

At block 480, method 400 may continue with the processing units determining an output of the ladder computation based on the performed plurality of iterations. More specifically, as illustrated with the bottom callout portion in FIG. 4, determining the output of the ladder computation may include identifying a value of the final bit $k_0$ (or $k_{n-1}$ for the ladder operations performed starting from the least significant bit of K). At block 482, responsive to identifying that the final bit has the first bit value (e.g., value 0), method 400 may continue with retrieving the output of the ladder computation from the memory location identified by the pointer stored in the first register. On the other hand, if the processing units identify that the final bit of the plurality of bits of the second number does not have a first bit value (e.g., $k_{n-1}$=1), method 400 may continue with retrieving the output of the ladder computation from the memory location identified by the pointer stored in the second register. For example, by virtue of performing the operations of block 482 or, in alternative, block 484, the accumulator value R0 is returned as the output of the ladder operation.

In some embodiments, the operations of method 400 may be performed by an accelerator circuit depicted in FIG. 3A and FIG. 3B. In particular, the accelerator circuit may include a first register (e.g., register A 312) to store a first pointer (e.g., Mem[1]) to a first memory location, the first memory location storing a seed number (e.g., initial accumulator value R0=1). The accelerator circuit may include a second register (e.g., register B 314) to store a second pointer (e.g., Mem[2]) to a second memory location, the second memory location storing a first number (e.g., initial value R0=X). The accelerator circuit may further include a third register (e.g., register C 324) to store a first dummy pointer (e.g., Dum[1]) and a fourth register to store a second dummy pointer (e.g., Dum[2]).

The accelerator circuit may include a decode unit (e.g., decode unit 301). The decode unit may have a plurality of multiplexers used to process instructions and identify operands of various computational operations. The decode unit may receive an instruction to perform, via a plurality of iterations, a ladder computation using the first number (e.g., X) and a second number (e.g., K). During each iteration of the plurality of iterations, the instruction may cause the decode unit to identify a respective bit (e.g., $k_j$) of a plurality of bits of the second number and perform a swapping operation which may include (i) swapping a pointer stored in the first register with a pointer stored in the second register, e.g., if the respective bit has a defined relationship to a reference bit (e.g., if $k_j \neq k_{j+1}$), or (ii) swapping a pointer stored in the third register with a pointer stored in the fourth register, e.g., if the respective bit does not have the defined relationship to the reference bit (e.g., if $k_j = k_{j+1}$). The decode unit may further identify a first operand using a pointer currently stored in the first register, which may be Mem[1] or Mem[2], depending on whether an even (or zero) or an odd number of swaps of the content of the first register and the second register have been performed since the start of the computations. The decode unit may also identify a second operand using a pointer currently stored in the second register.

The accelerator circuit may further include an execution unit (e.g., execution unit 305). The execution unit may include one or more multiplication, squaring, addition, doubling, etc., circuits. During each iteration of the plurality of iterations, the execution unit may perform a first computational operation on at least the first operand or the second operand. The first computational operation may include squaring the first (or the second) operand (e.g., using SQ 340 circuit) or doubling the first (or the second) operand. During each computational operation, the execution unit may also perform a second computational operation. The second computational operation may include multiplication of the first operand and the second operand (e.g., using MULT 342 circuit) or addition of the first operand to the second operand. During each of the plurality of iterations the execution unit may further store the output of the first computational operation in a memory location identified by the pointer currently stored in the first register, and may also store the output of the second computational operation in a memory location identified by the pointer currently stored in the second register. For example, the execution unit may store the output of the squaring operation (performed by SQ 340 circuit) in the same memory location which provided the input into the squaring operation and may further store the output of the multiplication operation (performed by MULT 342 circuit) into the other memory location.

The execution unit may generate an output of the ladder computation using the performed plurality of iterations. In some embodiments, to determine the output of the ladder computation, the execution unit may (i) retrieve the output of the ladder computation from a memory location identified by the pointer currently stored in the first register, if a final bit of the plurality of bits of the second number (e.g., if $k_0=0$), or (ii) retrieve the output of the ladder computation from a memory location identified by the pointer currently stored in the second register, if the final bit of the plurality of bits of the second number does not have a first bit value (e.g., if $k_0 \neq 0$).

Figure 5:
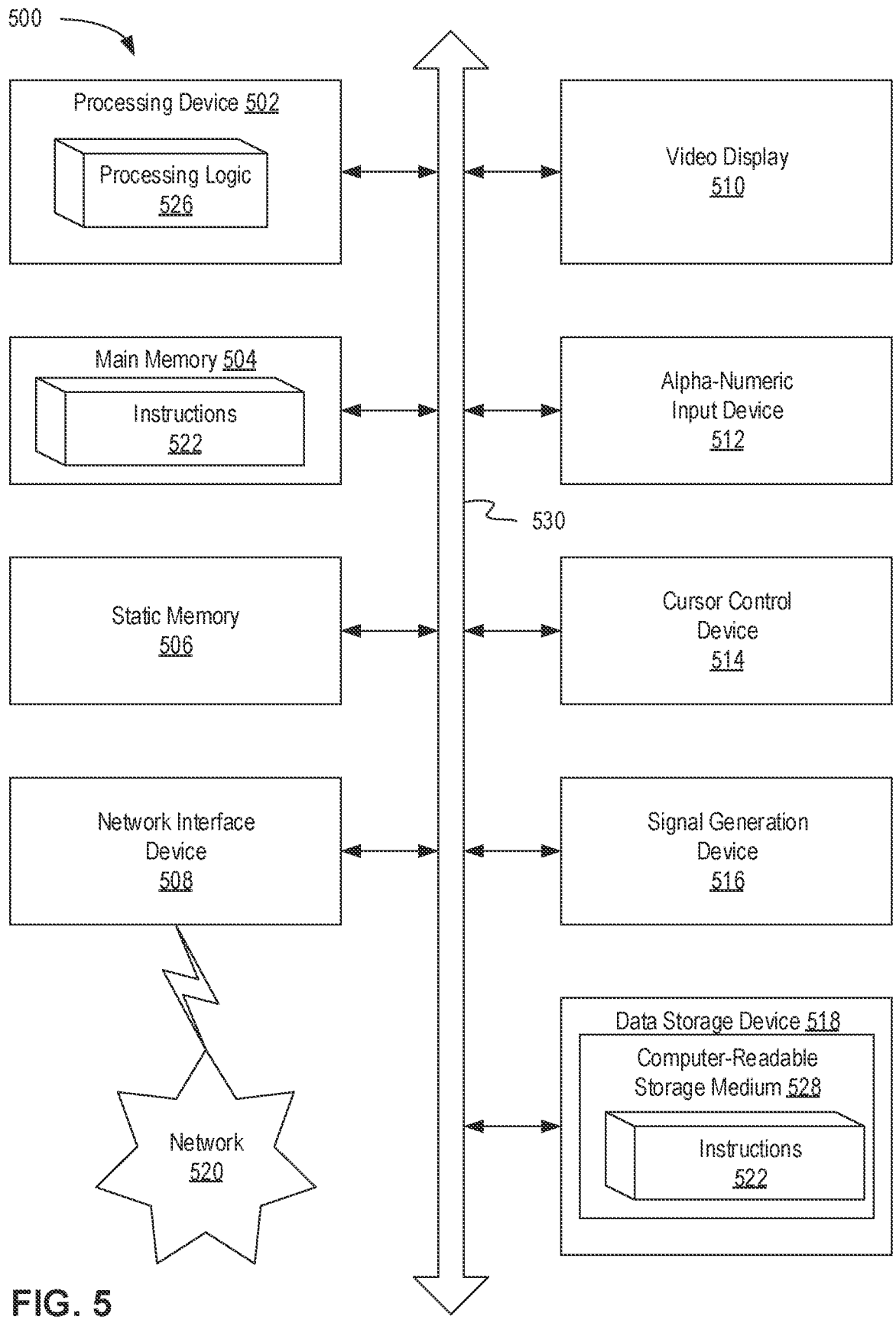
FIG. 5 depicts a block diagram of an example computer system operating in accordance with some implementations of the present disclosure.

FIG. 5 depicts a block diagram of an example computer system 500 operating in accordance with some implementations of the present disclosure. In various illustrative examples, example computer system 500 may be or include computer device 100, illustrated in FIG. 1. Example computer system 500 may be connected to other computer systems in a LAN, an intranet, an extranet, and/or the Internet. Computer system 500 may operate in the capacity of a server in a client-server network environment. Computer system 500 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 500 may include a processing device 502 (also referred to as a processor or CPU), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 518), which may communicate with each other via a bus 530.

Processing device 502 represents one or more general-purpose processing devices such as a microprocessor, central processing unit, or the like. More particularly, processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 502 may be configured to execute instructions implementing method 400 of ladder computations with balanced iterations for enhanced protection against side-channel attacks.

Example computer system 500 may further comprise a network interface device 508, which may be communicatively coupled to a network 520. Example computer system 500 may further comprise a video display 510 (e.g., a liquid crystal display (LCD), a touch screen, or a cathode ray tube (CRT)), an alphanumeric input device 512 (e.g., a keyboard), a cursor control device 514 (e.g., a mouse), and an acoustic signal generation device 516 (e.g., a speaker).

Data storage device 518 may include a computer-readable storage medium (or, more specifically, a non-transitory computer-readable storage medium) 528 on which is stored one or more sets of executable instructions 522. In accordance with one or more aspects of the present disclosure, executable instructions 522 may comprise executable instructions implementing method 400 of ladder computations with balanced iterations for enhanced protection against side-channel attacks.

Executable instructions 522 may also reside, completely or at least partially, within main memory 504 and/or within processing device 502 during execution thereof by example computer system 500, main memory 504 and processing device 502 also constituting computer-readable storage media. Executable instructions 522 may further be transmitted or received over a network via network interface device 508.

While the computer-readable storage medium 528 is shown in FIG. 5 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method to perform a ladder computation using a first number and a second number, the method comprising:
    storing a seed number in a first memory location (ML), the first ML identified by a pointer stored in a first register;
    storing the first number in a second ML, the second ML identified by a pointer stored in a second register;
    performing a plurality of iterations, wherein each of the plurality of iterations comprises:
        identifying a respective bit of a plurality of bits of the second number;
        executing a conditional operation, wherein the conditional operation comprises:
            responsive to identifying that the respective bit of the plurality of bits of the second number has a defined relationship to a reference bit, swapping the pointer stored in the first register and the pointer stored in the second register;
        performing a first computational operation on at least one of a first operand identified by the pointer stored in the first register or a second operand identified by the pointer stored in the second register; and
    determining an output of the ladder computation based on the performed plurality of iterations.

2. The method of claim 1, wherein the first computational operation comprises one of:
    squaring the first operand or doubling the first operand; and
wherein each of the plurality of iterations further comprises:
    performing a second computational operation, wherein the second computational operation comprises one of:
        multiplication of the first operand and the second operand or addition of the first operand and the second operand.

3. The method of claim 2, wherein each of the plurality of iterations further comprises:
    storing the output of the first computational operation in an ML identified by the pointer stored in the first register; and
    storing the output of the second computational operation in an ML identified by the pointer stored in the second register.

4. The method of claim 2, wherein the first computational operation and the second computational operation are modular computational operations.

5. The method of claim 1, wherein determining the output of the ladder computation comprises:
    responsive to identifying that a final bit of the plurality of bits of the second number has a first bit value, retrieving the output of the ladder computation from an ML identified by the pointer stored in the first register.

6. The method of claim 1, wherein determining the output of the ladder computation comprises:
    responsive to identifying that a final bit of the plurality of bits of the second number does not have a first bit value, retrieving the output of the ladder computation from an ML identified by the pointer stored in the second register.

7. The method of claim 1, wherein the reference bit has a value that is equal to:
    a first bit value, for a first iteration of the plurality of iterations, and
    a value of bit of the plurality of bits of the second number that is adjacent to the respective bit, for each subsequent iteration of the plurality of iterations.

8. The method of claim 1, wherein the ladder computation comprises a Montgomery ladder computation of at least one of: an exponentiation of the first number to a power of the second number or a multiplication product of the first number and the second number.

9. The method of claim 1, wherein the conditional operation further comprises:

responsive to identifying that the respective bit of the plurality of bits of the second number does not have the defined relationship to the reference bit, swapping a pointer stored in a third register and a pointer stored in a fourth register.

10. The method of claim 9, wherein the pointer stored in the third register and the pointer stored in the fourth register are dummy pointers, and wherein a hamming distance between the pointer stored in the first register and the pointer stored in the second register is equal to a hamming distance between the pointer stored in the third register and the pointer stored in the fourth register.

11. A processor comprising:
a memory device;
a plurality of registers; and
one or more circuits, communicatively coupled to the memory device, to:
store a seed number in a first memory location (ML) of the memory device, the first ML identified by a pointer stored in a first register of the plurality of registers;
store a first number in a second ML, the second ML identified by a pointer stored in a second register of the plurality of registers; and
perform a plurality of iterations, wherein for each of the plurality of iterations the one or more circuits are to:
identify a respective bit of a plurality of bits of a second number;
execute a conditional operation, wherein the conditional operation comprises:
responsive to identifying that the respective bit of the plurality of bits of the second number has a defined relationship to a reference bit, swapping the pointer stored in the first register and the pointer stored in the second register;
perform a first computational operation on at least one of a first operand identify the pointer stored in the first register or a second operand identified by the pointer stored in the second register; and
determine an output of a ladder computation based on the performed plurality of iterations.

12. The processor of claim 11, wherein to perform the first computational operation, the one or more circuits are to:
square the first operand or double the first operand; and wherein during each of the plurality of iterations the one or more circuits are further to:
perform a second computational operation, wherein the second computational operation comprises one of:
multiplication of the first operand and the second operand or addition of the first operand and the second operand.

13. The processor of claim 12, wherein the ladder computation comprises a Montgomery ladder computation of at least one of an exponentiation of the first number to a power of the second number or a multiplication product of the first number and the second number, and wherein the first computational operation and the second computational operation are modular computational operations.

14. The processor of claim 12, wherein during each of the plurality of iterations the one or more circuits are further to:
store the output of the first computational operation in an ML identified by the pointer stored in the first register; and
store the output of the second computational operation in an ML identified by the pointer stored in the second register.

15. The processor of claim 11, wherein to determine the output of the ladder computation the one or more circuits are to:
responsive to identifying that a final bit of the plurality of bits of the second number has a first bit value, retrieve the output of the ladder computation from an ML identified by the pointer stored in the first register.

16. The processor of claim 11, wherein to determine the output of the ladder computation the one or more circuits are to:
responsive to identifying that a final bit of the plurality of bits of the second number does not have a first bit value, retrieve the output of the ladder computation from an ML identified by the pointer stored in the second register.

17. The processor of claim 11, wherein the reference bit has a value that is equal to:
a first bit value, for a first iteration of the plurality of iterations, and
a value of bit of the plurality of bits of the second number that is adjacent to the respective bit, for each subsequent iteration of the plurality of iterations.

18. The processor of claim 11, wherein to perform the conditional operation, the one or more circuits are further to:
responsive to identifying that the respective bit of the plurality of bits of the second number does not have the defined relationship to the reference bit, swap a dummy pointer stored in a third register of the plurality of registers and a pointer stored in a fourth register of the plurality of registers.

19. An accelerator circuit comprising:
a first register to store a first pointer to a first memory location (ML), wherein the first ML stores a seed number;
a second register to store a second pointer to a second ML, wherein the second ML stores a first number;
a third register to store a first dummy pointer;
a fourth register to store a second dummy pointer;
a decode unit to:
receive an instruction to perform, via a plurality of iterations, a ladder computation using the first number and a second number, wherein during each iteration of the plurality of iterations the instruction is to cause the decode unit to:
identify a respective bit of a plurality of bits of the second number;
perform a swapping operation comprising one of:
responsive to the respective bit having a defined relationship to a reference bit, swapping a pointer stored in the first register with a pointer stored in the second register; or
responsive to the respective bit not having the defined relationship to the reference bit, swapping a pointer stored in the third register with a pointer stored in the fourth register;
identifying a first operand using a pointer currently stored in the first register; and
identifying a second operand using a pointer currently stored in the second register; and
an execution unit, wherein during each iteration of the plurality of iterations, the execution unit is to:
perform a first computational operation on at least the first operand or the second operand; and
generate an output of the ladder computation using the performed plurality of iterations.

20. The accelerator circuit of claim 19, wherein to perform the first computational operation the execution unit is to:
square the first operand or double the first operand; and
wherein during each of the plurality of iterations the execution unit is further to:
perform a second computational operation, wherein to perform the second computational operation the execution unit is to:
multiply the first operand and the second operand or add the first operand to the second operand.

21. The accelerator circuit of claim 20, wherein during each of the plurality of iterations the execution unit if further to:
store the output of the first computational operation in an ML identified by the pointer currently stored in the first register; and
store the output of the second computational operation in an ML identified by the pointer currently stored in the second register.

22. The accelerator circuit of claim 19, wherein to determine the output of the ladder computation, the execution unit is to:
responsive to identifying that a final bit of the plurality of bits of the second number has a first bit value, retrieve the output of the ladder computation from an ML identified by the pointer currently stored in the first register; or
responsive to identifying that the final bit of the plurality of bits of the second number does not have a first bit value, retrieve the output of the ladder computation from an ML identified by the pointer currently stored in the second register.

\* \* \* \* \*